(12) United States Patent
Bitra et al.

(10) Patent No.: US 10,609,629 B2
(45) Date of Patent: Mar. 31, 2020

(54) METHOD AND APPARATUS FOR EXPLOITING RADIO ACCESS TECHNOLOGY SYSTEM INFORMATION BLOCKS FOR TIME TRANSFER BASED POSITIONING

(71) Applicant: QUALCOMM Incorporated, San Diego, CA (US)

(72) Inventors: Suresh Kumar Bitra, Mangalagiri (IN); Arun Kumar Sharma Tandra, Hyderabad (IN); Ashwin Kumar Donthula, Hyderabad (IN); Bhaskara Batchu, Ameenpur Village (IN)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 15/012,592

(22) Filed: Feb. 1, 2016

(65) Prior Publication Data

US 2017/0223617 A1    Aug. 3, 2017

(51) Int. Cl.
*H04W 48/16* (2009.01)
*H04W 4/06* (2009.01)
(Continued)

(52) U.S. Cl.
CPC ............. *H04W 48/16* (2013.01); *G01S 19/05* (2013.01); *G01S 19/14* (2013.01); *H04B 7/2628* (2013.01); *H04W 4/06* (2013.01); *H04W 88/06* (2013.01)

(58) Field of Classification Search
None
See application file for complete search history.

(56) References Cited

U.S. PATENT DOCUMENTS

2013/0150036 A1    6/2013  Pattaswamy et al.
2014/0003417 A1    1/2014  Shauh et al.
(Continued)

FOREIGN PATENT DOCUMENTS

CN    101217746 A    7/2008
CN    102421084 A    4/2012
(Continued)

OTHER PUBLICATIONS

International Search Report and Written Opinion—PCT/US2016/068421—ISA/EPO—dated Apr. 10, 2017, 16 pages.

*Primary Examiner* — Angel T Brockman
(74) *Attorney, Agent, or Firm* — Kilpatrick Townsend & Stockton, LLP

(57) ABSTRACT

Disclosed is a method and apparatus for exploiting Radio Access Technology (RAT) system information blocks for global navigation satellite system (GNSS) positioning. The method may include processing, by a mobile device with carrier aggregation, a voice call via a first RAT, the processing of the voice call causing second RAT capabilities of the mobile device to go out of service. The method may also include accessing a communications network using the second RAT with an available receiver of the mobile device during the voice call via the first RAT. The method may also include obtaining, with the available receiver, timing information from one or more broadcast system information blocks of the second RAT, and determining a time based, at least in part, on the obtained timing information.

26 Claims, 6 Drawing Sheets

(51) Int. Cl.
*H04B 7/26* (2006.01)
*G01S 19/05* (2010.01)
*G01S 19/14* (2010.01)
*H04W 88/06* (2009.01)

(56) References Cited

U.S. PATENT DOCUMENTS

| | | |
|---|---|---|
| 2014/0146732 A1 | 5/2014 | Olufunmilola et al. |
| 2014/0200011 A1* | 7/2014 | Moilanen .......... H04W 72/0426 455/450 |
| 2014/0370824 A1* | 12/2014 | Larsen .................... H04B 7/12 455/77 |
| 2015/0282237 A1* | 10/2015 | Su ....................... H04W 76/025 455/552.1 |
| 2016/0007240 A1* | 1/2016 | Belghoul .......... H04W 36/0022 370/331 |
| 2016/0029199 A1* | 1/2016 | Shi ...................... H04B 1/3816 455/432.1 |
| 2017/0126274 A1* | 5/2017 | Kang .................. H04B 1/7136 |

FOREIGN PATENT DOCUMENTS

| | | |
|---|---|---|
| WO | 2012037280 A1 | 3/2012 |
| WO | WO 2015/171246 A1 | 11/2015 |
| WO | WO 2015/196348 A1 | 12/2015 |
| WO | WO 2016/014928 A1 | 1/2016 |

* cited by examiner

METHOD AND APPARATUS FOR EXPLOITING RADIO ACCESS TECHNOLOGY SYSTEM INFORMATION BLOCKS FOR TIME TRANSFER BASED POSITIONING

FIELD

The subject matter disclosed herein relates generally to performing a positioning process that exploits Radio Access Technology (RAT) system information blocks.

BACKGROUND

As the use of mobile communications devices, such as cellular telephones, becomes more pervasive, there will be more wireless networks that support the wireless communication of such devices. Furthermore, the more such devices are used in different facets of users' lives, such as personal use and work use, the usage becomes fragmented. For example, a single user may have one device for personal use, and a second device for work use, where the devices utilize different wireless communications network technologies.

Some mobile communications devices include multiple subscriber capabilities. That is, such a mobile device can have more than one subscriber identification module (SIM) for subscribing to, and providing service on, different carrier networks. The single mobile device, with multiple SIMs, can provide the user access to multiple wireless communications networks. Continuing the example above, the single user would be able to use one device for work and personal communications, both with different subscriber identifications.

One such device for accessing multiple networks as different subscribers, is the dual-SIM dual-standby (DSDS) mobile device with carrier aggregation (CA) (hereinafter DSDS+CA mobile device). The different SIMs provide subscriptions/access to different wireless communications networks, such as LTE, SRLTE, WCDMA, GSM, etc. The dual-standby capabilities of the mobile device choose which SIM is active to send/receive a call, and cause the other SIM to go out of service. Carrier aggregation, however, enables the device to coordinate data received from the different wireless communications networks. Thus, when a DSDS+CA mobile device receives a call, on either subscriber technology, the other subscriber technology goes out of services. As an example, when such a device utilizes a first subscription to an SRLTE/CSFB wireless communications network and a second subscription to an SRLTE/3G/2G wireless communications network, a non-voice over LTE call on either subscription/SIM (e.g., asynchronous network voice call) will cause the LTE capabilities of the mobile device to go out of service.

When global navigation satellite system (GNSS) positioning is initiated in a DSDS+CA mobile device during a non-LTE voice call, resulting in the mobile device being connected to a communications network, the time to first fix for GNSS positioning purposes will take a considerable amount of time based on the device's ability to receive GPS signals and associated GPS signal strength. Furthermore, yield can be low depending on these conditions leading to increased power consumption as a result of the increased time needed to complete the one or more GNSS positioning processes.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
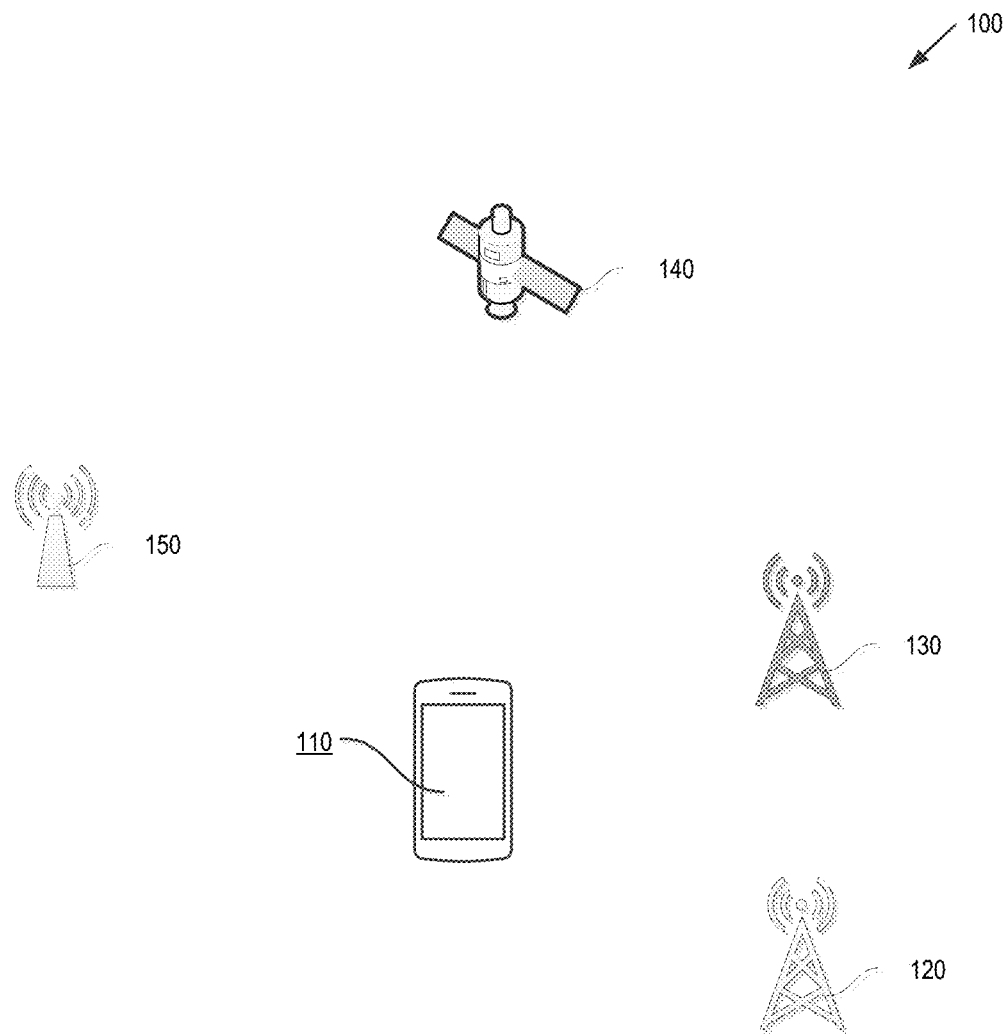
FIG. 1 is a block diagram of an exemplary system architecture for exploiting Radio Access Technology (RAT) system information blocks for GNSS positioning in a mobile device having carrier aggregation capabilities.

FIG. 1 is a block diagram of an exemplary system architecture 100 for exploiting Radio Access Technology (RAT) system information blocks for GNSS positioning in a mobile device having carrier aggregation capabilities. In one embodiment, the system 100 includes a mobile device 110. Mobile device 110 is a mobile computing device, such as a mobile telephone, personal digital assistant, tablet computer, wearable device, gaming device, medical device, etc. capable of sending and receiving wireless communications over the wireless communications network(s). In one embodiment, the mobile device 110 is a dual-sim dual-standby mobile device having carrier aggregation capabilities. However, consistent with the discussion herein, mobile device 110 may have carrier aggregation capabilities and include more than two SIMs, or may be a single SIM mobile device, with a carrier aggregation receiver. Embodiments of mobile devices are discussed in greater detail below.

The system may also include two or more wireless communications networks established by one or more of base stations (e.g., base stations 120 and 130), wireless access point 150, and satellite system 140. In one embodiment, a first wireless communications network is established by base station 120, and a second wireless communications network is established by base station 130. Although only two base stations are illustrated, additional base stations can be deployed to further established the first and second wireless communications networks, as well as to established additional wireless communications networks. In embodiments, different wireless communication networks may each operate using the same or different wireless communication technology supporting the same or different RATs, as supported by the base stations (e.g., base stations 120 and 130), one or more wireless access points (e.g., wireless access point 150), and one or more satellite systems (e.g., satellite system 140). For example, any combination of LTE, CDMA, CDMA2K, GSM, etc. communication networks, as well as communications network supporting future RATs (e.g., a 5G communications network), may coexist within the system architecture 100 of FIG. 1. Furthermore, the different wireless communications networks established by base stations 120 and 130 may be wireless communications networks of the same or different carrier.

In one embodiment, base station 120, as well as additional base stations (not illustrated) that are part of the same first wireless communications network, provide a wireless communications network that utilizes a first type of RAT, such as LTE. Furthermore, the wireless communications network may provide additional support for circuit switched fallback (CSFB) services, such as providing voice and messaging services to mobile devices utilizing asynchronous communication technologies, such as non-LTE GSM.

In one embodiment, base station 130, as well as additional base stations (not illustrated) that are part of the same second wireless communications network, provide a communications network utilizing a second RAT, such as a non-LTE RAT. In one embodiment, the second communications network is an asynchronous communications network, such as a GSM, asynchronous LTE, etc. communications network.

In one embodiment, mobile device 110 may communicate over both the first communications network established by base station 120 and the second communications network established by base station 130. In one embodiment, to enable communication over the different wireless communications networks with different technologies, mobile device 110 may include one, two, or more subscriber information modules (SIMs). That is, mobile device 110 is capable of receiving, sending, and processing signals over a first RAT (e.g., over an LTE communications network) established by base station 120, and is capable of receiving, sending, and processing signals over a second RAT (e.g., from a non-LTE communications network) established by base station 130. Each SIM within mobile device 110 may provide access to different wireless communications networks of different carriers. Furthermore, each SIM may enable mobile device 110 to connect to different wireless communication networks of the same carrier.

In one embodiment, for example, mobile device 110 is a dual-SIM dual-standby mobile device, where each of the SIMs within mobile device 110 enables the mobile device 110 to connect/subscribe to different wireless communications networks. The different wireless communications network may be provided by different wireless network carriers (e.g., a first SIM enables access to carrier A's LTE communications network, and a second SIM enables access to carrier B's non-LTE communications network). Furthermore, a single SIM within mobile device 110 may also enable mobile device 110 to connect/subscribe to wireless communication networks utilizing different RATs provided by the same wireless network carrier (e.g., the first SIM enables access to carrier A's LTE communications network, and also enables access to carrier A's non-LTE communications network). In one embodiment, mobile device's 110 carrier aggregation (CA) capabilities enable coordinating communication and/or data usage over the different communications networks and/or subscriptions. However, because the mobile device 110 is a dual standby mobile device, when mobile device 110 utilizes a first SIM to connect to one network (e.g., to place or receive a call), the other SIM providing access to the other network goes out of service. In embodiments, discussed in greater detail below, the mobile device 110 may be either a single receiver mobile device or a dual receiver mobile device capable of communicating over the different wireless communications networks using different RATs. Furthermore, as will be discussed in greater detail below, the carrier aggregation capabilities of the mobile device 110 may be used to capture and decode RAT system information blocks broadcast over a communications network to perform a positioning process on the mobile device, even when RAT capabilities of the mobile device for that communications network are out of service.

Figure 2A:
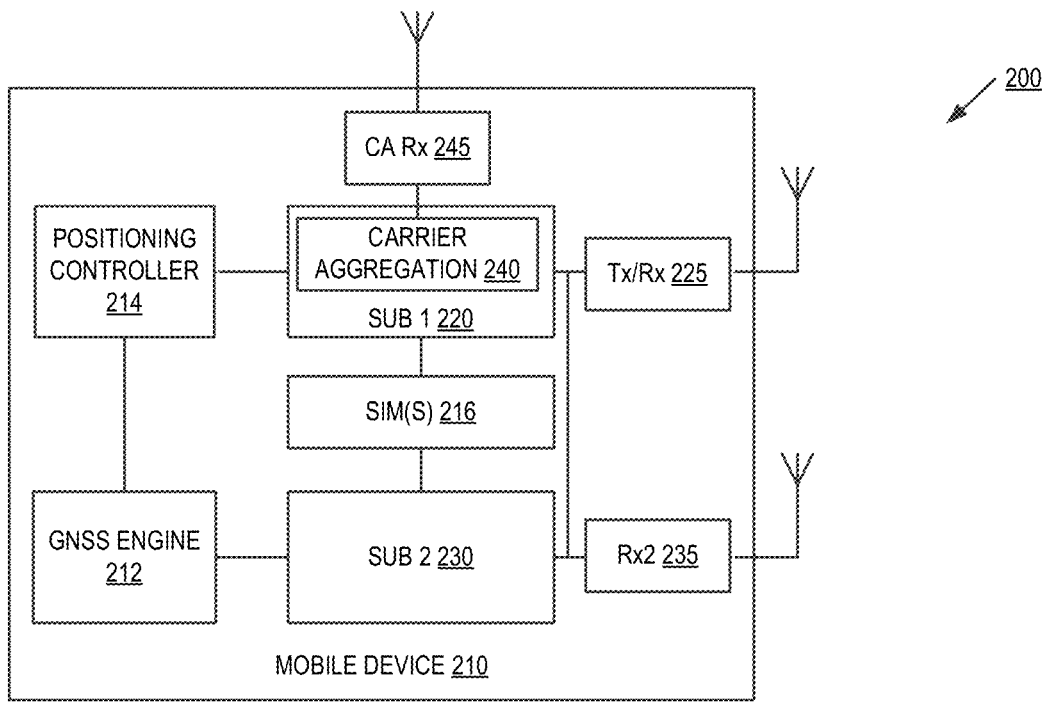
FIG. 2A is block diagram of one embodiment of a dual receiver dual-standby mobile device having carrier aggregation capabilities.

FIG. 2A is block diagram of one embodiment 200 of a dual receiver dual-standby mobile device 210 having carrier aggregation capabilities.

The illustrated dual receiver dual-standby mobile device 210 may include one, two, or more SIMs (e.g., SIM(s) 216) for accessing wireless communications networks of the same or different wireless communications network carriers. A first sub 220 enables a subscription to a first wireless communication network, and a first transceiver/receiver 225 coupled with the first sub 220 enables the sending and receiving of signals over a first RAT using the first wireless communication network (e.g., a wireless communications network established by base station 120). The dual receiver dual-standby mobile device 210 further includes a second sub 230 coupled with a second receiver 235 for sending and receiving signals over a second RAT using a second wireless communication network (e.g., a wireless communications network established by base station 130). For example, the first sub 220 may be coupled with a receiver/transceiver that supports a SRLTE/CSFB wireless communications network, and the second sub 230 may be coupled with a receiver that supports another wireless communications technology (e.g., LTE, SRLTE, WCDMA, etc.). In one embodiment, the second sub 230 utilizes the transceiver 225 to send signals using the second RAT over the second wireless communications network. Furthermore, in embodiments, a single SIM from SIM(s) 216 may provide access to different wireless communications networks of the same carrier utilizing subs 220 and 230, or different SIMs from SIM(s) 216 may each provide access utilizing subs 220 and 230 to a different wireless communications networks provided by the same or different carriers.

The dual receiver dual-standby mobile device 210 further includes a carrier aggregation module 240 coupled with a carrier aggregation receiver 245. The carrier aggregation receiver 245 is an independently tunable receiver of mobile device 210 capable of tuning to networks using different RATs, such as tuning to either an LTE network or a non-LTE network. In one embodiment, the carrier aggregation receiver 245 is not a transceiver, and is therefore not capable of transmission. However, the carrier aggregation receiver 245 can tune to the different wireless communications networks to coordinate data usage between the networks for the mobile device 210, determine which of the SIM(s) 216 to use for a connection, share resources by connections established for subs 220 and 230 and/or SIM(s) 216, etc. Carrier aggregation module 240 is responsible for tuning the carrier aggregation receiver 245 to the appropriate network using the appropriate RAT.

As discussed herein, for embodiments of dual receiver dual-standby mobile devices supporting LTE and non-LTE RATs, such as mobile device 210, when a voice over non-LTE call is processed using the first sub 220, LTE capabilities provided by the first sub 220 and services provided by the second sub 230 both go out of service. Similarly, when a voice over non-LTE call is processed using the second sub 230, the entire first sub 220 (including LTE services provided by the first sub 220) will go out of service. As yet another example, when a voice call over an asynchronous LTE communication network is processed by a first sub (e.g., sub 220), the second sub (e.g., sub 230) that may provide access to a synchronous LTE communication network providing specific system information blocks discussed in greater detail below will go out of service. As discussed above, this is due to the dual receiver dual-standby mobile device having only one transceiver 225.

Figure 2B:
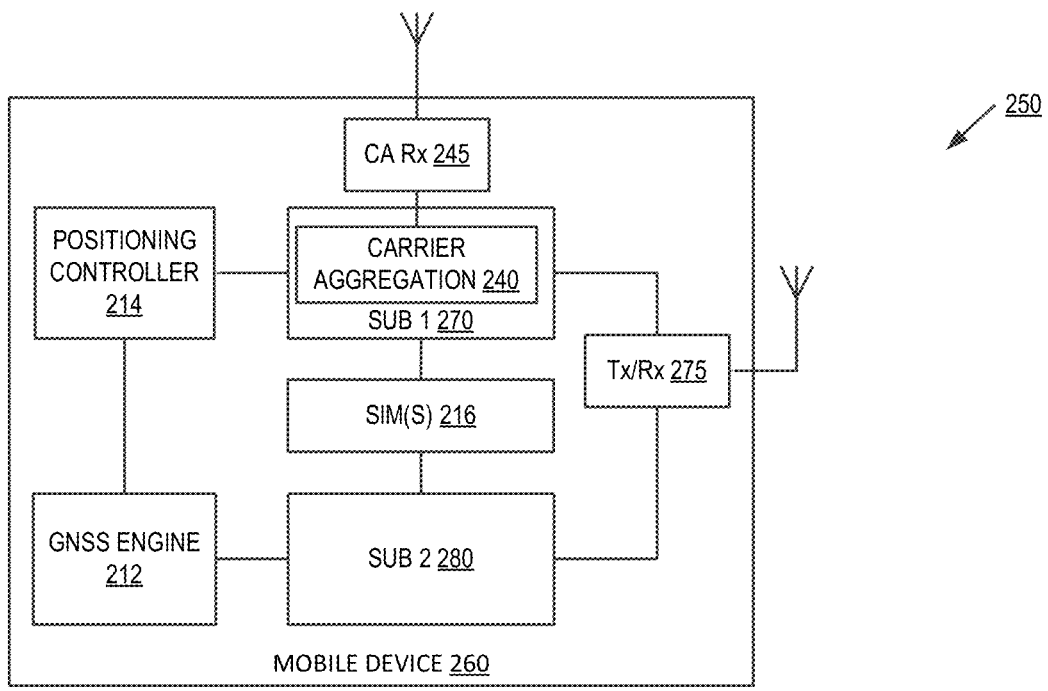
FIG. 2B is block diagram of one embodiment of a single receiver dual-standby mobile device having carrier aggregation capabilities.

FIG. 2B illustrates a similar mobile device 260 to mobile device 210 illustrated in FIG. 2A. However, mobile device 260 is a single receiver dual-standby mobile device. As discussed above, mobile device 260 may also include one or more SIMs (e.g., SIM(s) 216) for providing access to different carrier networks. In mobile device 260, both subs (e.g., subs 270 and 280) share the single transceiver/receiver 270 for sending and receiving signals on their respective wireless communication networks. Furthermore, mobile device 260 also includes a carrier aggregation module 240 for controlling the carrier aggregation receiver 245 for coordinating usage of the different SUBs 270 and 280, and the different SIMs 216. For example, in an embodiment where mobile device 260 processes a voice call utilizing a non-LTE RAT, all LTE RAT services provided by sub 270 and sub 280 go out of service as a result of also having a single transceiver 275 chain.

As discussed in greater detail below, both mobile devices (e.g., 210 and 260) further include GNSS engine 212 for performing a positioning process. In one embodiment, the positioning process may utilize time-transfer for determining the location of the mobile device based on timing signals broadcast in a wireless communication network (e.g., the network established by base station 120) and/or from one or more satellite systems (e.g., from satellite system 140). As would be understood by those skilled in the art, the reception of the timing signals assists GNSS engine 212 to more efficiently determine a location of the device. In one embodiment, GNSS engine 212 may transmit intermediate timing signals/measurements to a third party, such as a location server, assistance server, etc. coupled with a wireless communication network (e.g., coupled with one or more of base stations 120 and 130) or coupled with a wireless local area network (WLAN) (e.g., coupled with access point 150), and have results of a positioning process returned to the GNSS engine 212.

In one embodiment, with reference to FIG. 2A, and similarly for FIG. 2B, after initiating (e.g., receiving or placing) a voice call over a first RAT (e.g., a voice call initiated on an asynchronous, LTE or non-LTE, network), which causes second RAT capabilities of mobile device 210 to go out of service (e.g., synchronous LTE capabilities to go out of service), a GNSS positioning process is started by GNSS engine 212. In one embodiment, positioning controller 214 determines that the second RAT is out of service, and instructs the carrier aggregation module 240 to tune the carrier aggregation receiver 245 to a communications network using the second RAT. In one embodiment, because the carrier aggregation receiver 245 is an independently tunable receiver (e.g., can be tuned to any supported communications network regardless of which of SIM(s) 216 and/or SUBs 220 or 230 is connected to which network), the carrier aggregation receiver 245 is able to listen for various broadcast information transmitted over the communications network that uses the second RAT. In one embodiment, carrier aggregation module 240 utilizes the carrier aggregation receiver 245 to search for, and obtain, specific RAT system information blocks (SIBs). The RAT SIBs are broadcast signals from a wireless communications network that contain various forms of network information. Furthermore, the various forms of information, and the information contained therein, are divided up into different SIBs. In one embodiment, carrier aggregation module 240 searches for, and obtains, the specific RAT SIBs that contain timing information for use by GNSS engine when performing a positioning process using time transfer.

In one embodiment, for example, the carrier aggregation module 240 tunes the carrier aggregation receiver 245 to an LTE network to search for specific LTE SIBs. In response to detecting the specific LTE SIBs, the positioning controller 214 decodes the specific SIBs to obtain timing information suitable for use by the GNNS engine 214 for performing time transfer. In one embodiment, the specific SIBs searched for, and subsequently decoded, include one or more of system information block 8 (SIB8) and system information block 16 (SIB16) broadcast over an LTE communications network. SIB8 carries CDMA system time and CDMA system parameters such as system identifiers, network identifiers, and time zone information. SIB 16 carries GPS timing information. Other SIBs broadcast over other types of wireless communications networks, with additional and/or alternative information suitable for performing time transfer, can also be decoded by positioning controller 214 and utilized by GNSS engine 212 as discussed herein.

Upon one or more of the SIBs being obtained and decoded, and the timing information extracted from the decoded blocks, the extracted timing information is provided by positioning controller 214 to GNSS engine 212. In one embodiment, continuing the example above where one or more types of LTE SIBs are obtained and decoded, the timing information extracted from the decoded SIB8 and/or SIB16 blocks is used for performing time transfer that may include a positioning determination by the GNSS engine 212, and alternatively may include GNSS engine 212 transferring the timing information to an external device (e.g., a location server, assistance server, etc.). In one embodiment, GNSS engine 212 performs the time transfer to determine a coarse position of the mobile device (e.g., utilizing SIB8 time zone and system/network ID information) and/or decreases a time to first fix in a satellite based positioning process (e.g., utilizing SIB16 GPS time information). Regardless of which timing information, SIB8 and/or SIB16 timing information, is used for time transfer by the GNSS engine 212, the GNSS engine 212 is able to utilize the information to reduce the time to first fix, increase GNSS sensitivity, and reduce power consumption as a result of performing a more efficient positioning process. Furthermore, since the SIBs are transmitted over an LTE wireless communications network, the positioning process can occur even in weak signal areas and areas of low visibility (e.g., indoors, cityscapes, etc.).

In one embodiment, however, before the GNSS engine 212 utilizes the decoded RAT SIB timing information for the time transfer, the mobile device first determines if it already has timing information for providing to the GNSS engine for the time transfer. If the GNSS engine 212 already has such timing information available to it, GNSS engine 212 compares the quality of its information with the decoded timing information from obtained and decoded RAT SIBs. That is, the mobile device 210 will utilize the decoded timing information for time transfer when the decoded information is more accurate than the timing information already available to the mobile device 210. When the decoded timing information is not more accurate, the timing information already available to the mobile device 210 is utilized for performing time transfer.

Although FIGS. 2A and 2B illustrate and describe the carrier aggregation receiver 245 as the available/independently tunable receiver, other embodiments however, can use any available receiver capable of being independently tuned to a communication network that uses a RAT providing appropriate SIBs to perform the information acquisition and positioning processes discussed herein. Furthermore, the mobile devices discussed herein need not be limited by the number of SIMs within the device, as devices with multiple SIMs (e.g., two SIM, three SIM, four SIM, etc. devices) may also utilize the information acquisition and positioning processes discussed herein. Furthermore, a mobile device having a single SIM, but also having an independently tunable receiver for carrier aggregation, may also utilize the information acquisition and positioning processes discussed herein.

Figure 3:
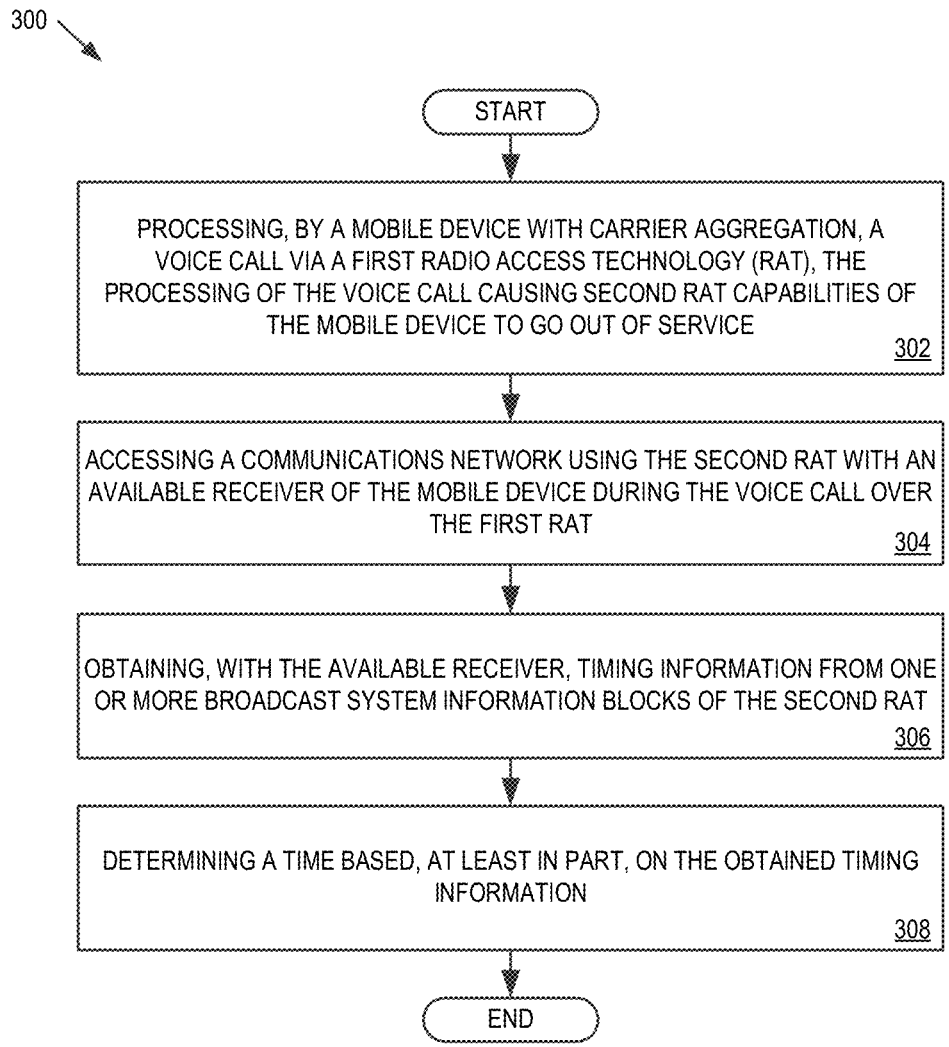
FIG. 3 is a flow diagram of one embodiment of a method for performing time transfer based GNSS positioning in a mobile device having carrier aggregation capabilities.

FIG. 3 is a flow diagram of one embodiment of a method 300 for performing time transfer based GNSS positioning in a mobile device having carrier aggregation capabilities. The method 300 is performed by processing logic that may comprise hardware (circuitry, dedicated logic, etc.), software (such as is run on a general purpose computer system or a dedicated machine), firmware, or a combination. In one embodiment, the method 300 is performed by a mobile device (e.g., mobile device 110, 210, or 260).

Referring to FIG. 3, processing logic at the mobile device begins by processing a voice call via a first RAT, where the processing of the voice call causes second RAT capabilities of the mobile device to go out of service (processing block 302). In embodiments, discussed herein, the mobile device may be a dual subscription dual-standby mobile device with carrier aggregation capabilities (DSDS+CA mobile device). Furthermore, the mobile device may have a different receiver for each sub within the mobile device, or a single receiver shared by each sub within the mobile device. However, each of these devices utilizes a single transceiver for transmitting signals during the voice call over the first RAT. For example, where the second RAT is an LTE RAT and the first RAT is a non-LTE RAT, when a voice call over the non-LTE RAT communicably couples the mobile device's single transceiver to an asynchronous wireless communications network during the voice call, LTE RAT capabilities of the mobile device go out of service.

Processing logic then accesses a communications network using the second RAT with an available receiver of the mobile device during the voice call over the first RAT (processing block 304). In one embodiment, the accessing of the communications network can be initiated during time transfer performed on the mobile device during the voice call over the first RAT. In one embodiment, the time transfer may be part of a positioning process initiated by a user of the mobile device during the voice call, such as a voice call over a non-LTE RAT, by the mobile device itself (e.g., in response to an application, emergency condition, etc. triggered on the mobile device), or by the wireless communications network to which the mobile device is communicably coupled. In one embodiment, the positioning process that is initiated utilizes timing information from the initiated time transfer to determine a position of the mobile device.

In one embodiment, the available receiver is not a transceiver and thus is not capable of transmitting signals. However, the mobile device having carrier aggregation capabilities includes a carrier aggregation receiver typically utilized by the mobile device when coordinating communication and/or data usage of the mobile device between different wireless communications networks. Because the carrier aggregation receiver is an independently tunable receiver (e.g., can be tuned to different radio reception frequencies regardless of the other receiver/transceiver of mobile device being dedicatedly assigned to a network using a first RAT or placed out-of-service), the carrier aggregation receiver can be used by processing logic as the available receiver. Processing logic tunes the carrier aggregation receiver to a wireless communications network to access that wireless communications network using the second RAT, such as a network utilizing an LTE RAT.

After the wireless communications network is accessed with the available receiver via the second RAT, processing logic then obtains, with the available receiver, timing information from one or more broadcast system information blocks of the second RAT (processing block 306). As discussed herein, the tuning of the available receiver, such as a carrier aggregation receiver, to access an LTE wireless communication network, enables processing logic to listen for, obtain, and decode various system information blocks broadcast over the LTE wireless communication network. For example, SIB8 and SIB16 blocks both contain timing information that can be used by processing logic for performing a positioning process. Thus, processing logic can listen for, obtain, and decode SIB8 and/or SIB16 blocks.

Processing logic determines a time based, at least in part, on the obtained timing information (processing block 308). In one embodiment, the determination of the time may be performed during and/or for a time transfer based positioning process. Furthermore, in embodiments, where the obtained and decoded SIBs contain timing information, processing logic is able to use the timing information when performing one or more triangulation based positioning methods, such as those that use satellite signals to locate the user's position. The timing information obtained from the decoded SIBs can aid in reducing search lobes and acquiring satellite signals more quickly, in order to reduce the time to first positioning determination and/or satellite fix. As discussed above, when utilizing an LTE RAT to obtain LTE broadcast SIBs, the SIB8 blocks contain CDMA system and time information that enables a positioning process to determine a coarse position of the mobile device. Furthermore, SIB16 blocks contain precise GPS timing information that enables a positioning process to search for and obtain GPS signal data more efficiently (e.g., by reduction in GNSS search window/search lobes), thereby decreasing a time to first fix, decreasing device power consumed while attempting to obtain a fix, and improving sensitivity of a GNSS engine. Processing logic may use one or both of SIB8 and SIB16 simultaneously and/or as input to each other. For example, the SIB8 coarse positioning may be used as a seed position for a time transfer based positing process performed using the SIB16 GPS timing information.

Figure 4:
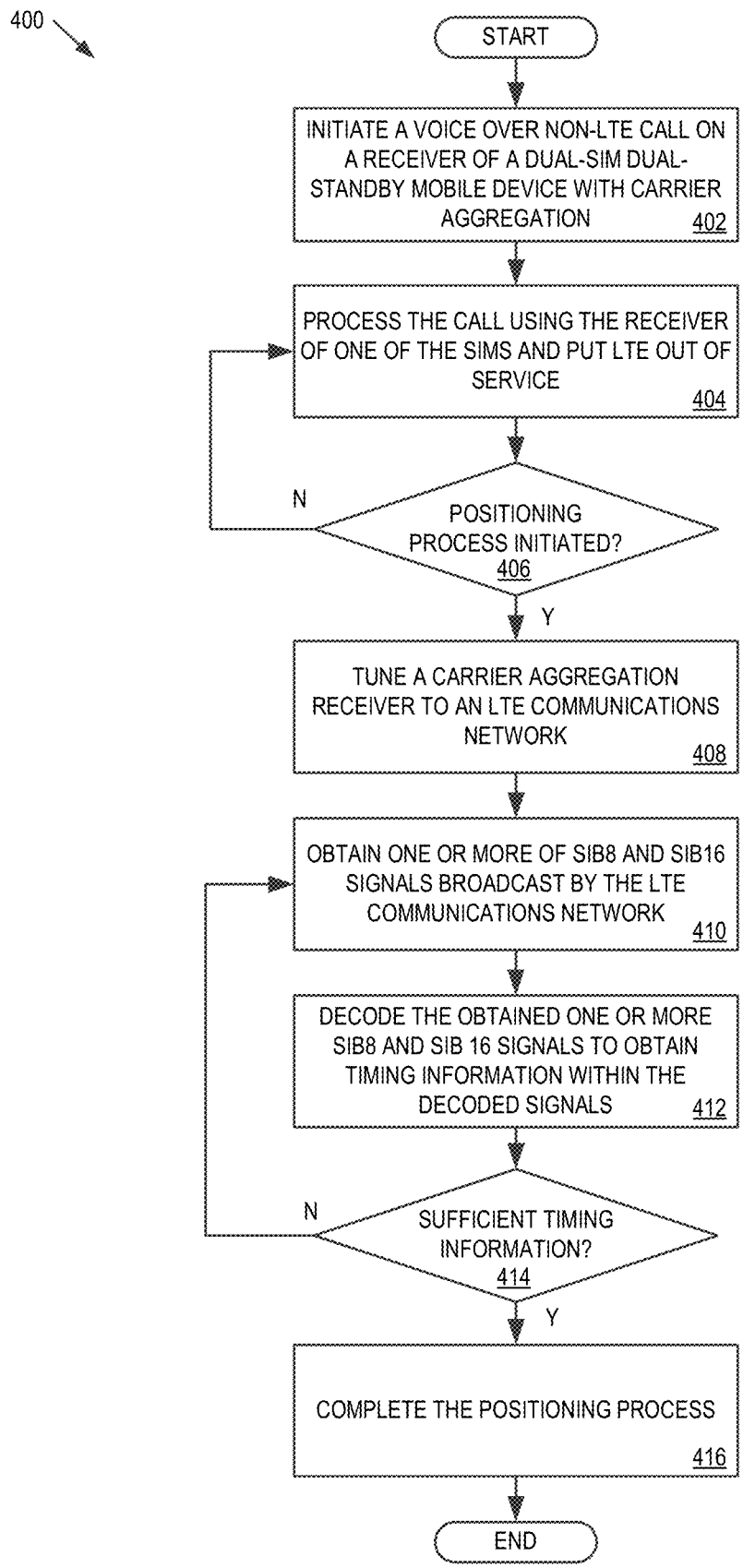
FIG. 4 is a flow diagram of one embodiment of another method for performing GNSS positioning in a mobile device having carrier aggregation capabilities.

FIG. 4 is a flow diagram of one embodiment of another method 400 for performing time transfer based GNSS positioning in a mobile device having carrier aggregation capabilities. The method 400 is performed by processing logic that may comprise hardware (circuitry, dedicated logic, etc.), software (such as is run on a general purpose computer system or a dedicated machine), firmware, or a combination. In one embodiment, the method 400 is performed by a mobile device (e.g., mobile device 110, 210, or 260). Furthermore, the process illustrated in FIG. 4 provides an example where LTE and non-LTE RATs are utilized in a dual subscriber dual standby mobile device with carrier aggregation.

Referring to FIG. 4, processing logic begins by initiating a voice over non-LTE call on a dual subscriber dual standby mobile device with carrier aggregation (DSDS+CA) (processing block 402). Processing logic then processes the call using the receiver of one of the subs and puts the LTE capabilities of the mobile device out of service (processing block 404). As discussed herein, a DSDS+CA mobile device may support communication over LTE wireless communication networks, as well as over a non-LTE wireless communications networks, where the different networks can be provided by the same carrier or different carriers. As further discussed herein, when the voice over non-LTE call is received and/or placed by the DSDS+CA mobile device (e.g., a CSFB call utilizing a sub that supports LTE, or a GSM, CDMA, etc. call utilizing a different sub that supports communication on an asynchronous network), the LTE capabilities provided by both subs of the DSDS+CA device go out of service.

Processing logic then determines if a positioning process is initiated (processing block 406). For example, during the voice of non-LTE call, a user may initiate a positioning process on a mobile device by requesting a location-based service, launching a location-based application, triggering an emergency function, etc. As another example, a positioning process may alternatively be initiated by the mobile device or the wireless network, such as when the mobile device detects an emergency condition or when the wireless network seeks location/tracking information associated with the mobile device. When such a positioning process is initiated, time transfer by the mobile device may be used to support the initiated positioning process. When a positioning process is not initiated, the process returns to processing block 404 to continue processing the call.

However, when a positioning process has been initiated, the process will continue to process the call, but also advances to processing block 408 and tunes a carrier aggregation receiver to an LTE wireless communications network (processing block 408). That is, processing logic adjusts the reception frequency of the carrier aggregation receiver to receive the desired LTE signal frequency that is used by the LTE wireless communications network to broadcast various signals. Once tuning is completed, processing logic obtains and decodes LTE synchronization signals in order to then obtain at least one of SIB8, SIB16, or a combination SIB8 and SIB16 signals broadcast by the LTE communications network (processing block 410).

Processing logic decodes the obtained one or more SIB8 and SIB16 signals to obtain timing information within the decoded signals (processing block 412). The timing information obtained is timing information suitable for performing time transfer to determine a coarse position of the mobile device (e.g., utilizing timing information in the SIB8 blocks) and/or to increase the time to first fix, sensitivity, and save power for a satellite system time transfer based positioning determination (e.g., utilizing timing information in the SIB16 blocks).

Processing logic determines whether there is sufficient timing information (processing block 414). In one embodiment, there is sufficient timing information when a coarse and/or fine position of the mobile device can be determined by a positioning process that utilizes the time transfer. When there is, processing logic utilizes the timing information to complete the time positioning process (processing block 416). Otherwise, processing logic returns to processing block 410 to obtain additional timing information needed in order to complete the positioning process.

Figure 5:
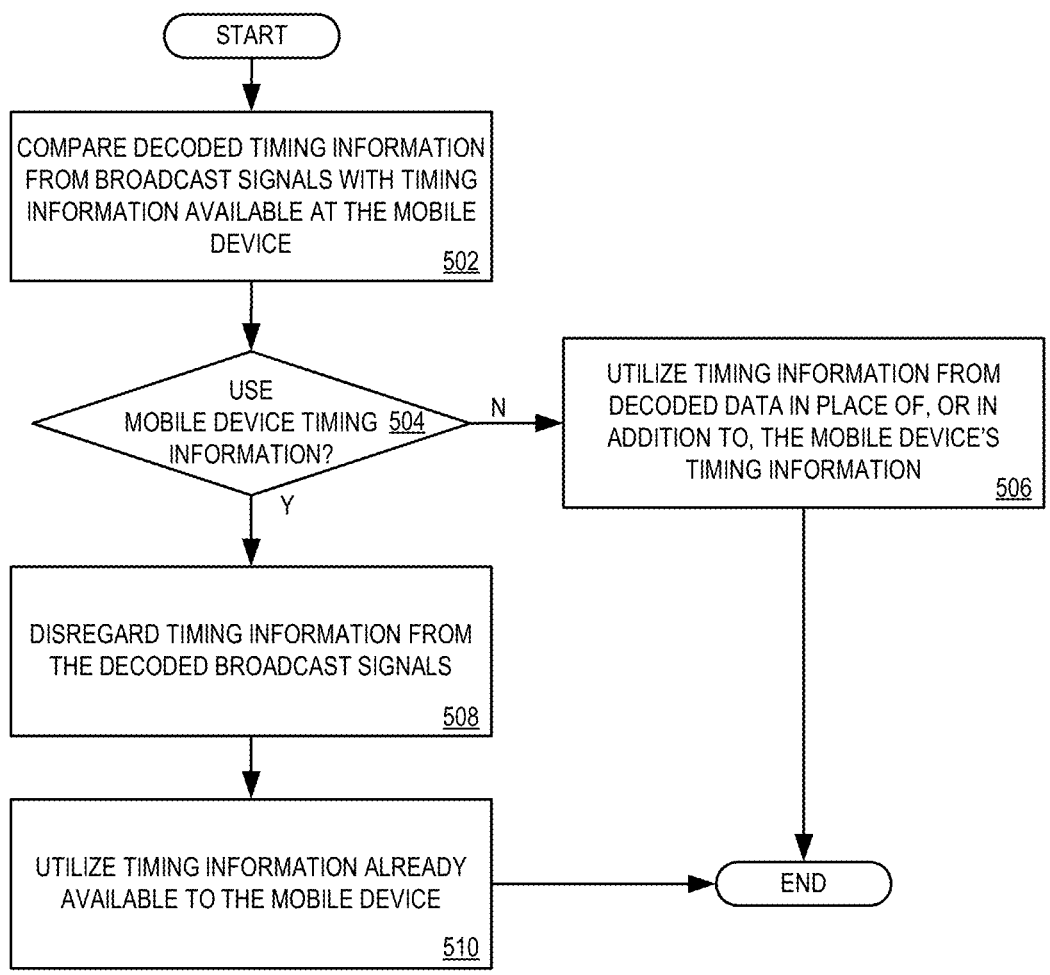
FIG. 5 is a flow diagram of one embodiment of a method for determining which timing information to use when performing GNSS positioning in a mobile device having carrier aggregation capabilities.

FIG. 5 is a flow diagram of one embodiment of a method 500 for determining which timing information to use when performing GNSS positioning in a mobile device having carrier aggregation capabilities. The method 500 is performed by processing logic that may comprise hardware (circuitry, dedicated logic, etc.), software (such as is run on a general purpose computer system or a dedicated machine), firmware, or a combination. In one embodiment, the method 500 is performed by a mobile device (e.g., mobile device 110, 210, or 260).

Referring to FIG. 5, processing logic begins by comparing decoded timing information from broadcast signals with timing information available at the mobile device (processing block 502). In embodiment, the timing information can be obtained by processing logic as discussed above in FIG. 3 and/or FIG. 4. For example, the timing information can be extracted from obtained and decoded SIB8 and SIB16 LTE broadcast signals.

Processing logic then determines whether to use mobile device timing information (processing block 504). In one embodiment, the mobile device timing information may include timing information already available at the mobile device. For example, the mobile device may include an internal clock. When processing logic determines which timing source to use (e.g., mobile timing information or timing information from SIBs), processing logic determines which source of timing information is more accurate. When the mobile device's available timing information is less accurate than the timing information obtained/decoded from the broadcast signals, processing logic utilizes this timing information in place of, or in addition to, the mobile device's timing information (processing block 506). However, when the mobile device's timing information is determined to be more accurate, processing logic disregards the timing information from the decoded broadcast signals (processing block 508), and utilize this timing information already available to the mobile device (processing block 510). The chosen timing information may then be utilized by the mobile device to perform time transfer for performing a positioning process, as discussed above.

Figure 6:
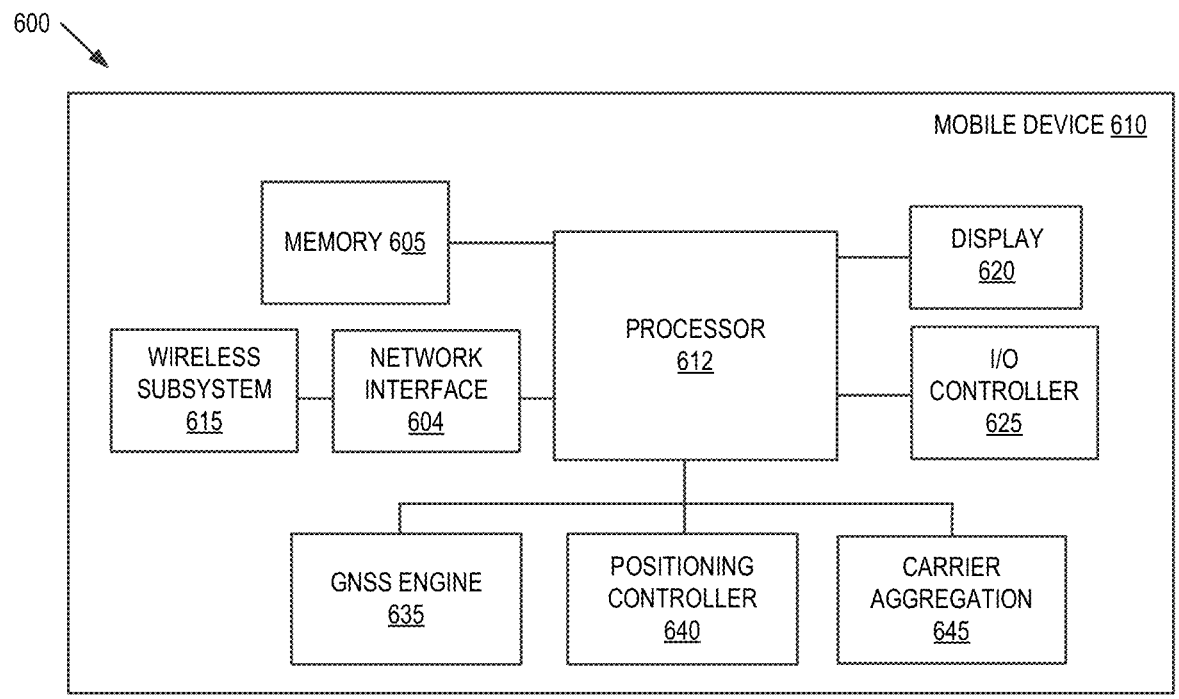
FIG. 6 is block diagram of one embodiment of a mobile device.

FIG. 6 is block diagram of one embodiment 600 of a mobile device. Mobile device 610 provides additional details for mobile device 210 discussed above in FIG. 2A and mobile device 260 discussed above in FIG. 2B.

In one embodiment, mobile device 610 is a system, which may include one or more processors 612, a memory 605, I/O controller 625, network interface 604, and display 620. Mobile device 610 may also include a number of processing modules, which may be implemented as hardware, software, firmware, or a combination, such as GNSS engine 635, positioning controller 640, and carrier aggregation module 645. It should be appreciated that mobile device 610 may also include, although not illustrated, a user interface (e.g., microphones, keyboard, touch-screen, or similar devices), a power device (e.g., a battery), as well as other components typically associated with electronic devices. Although only a single wireless subsystem 615 is illustrated, it is understood that network interface 604 may also be coupled to a number of wireless subsystems 615 (e.g., Bluetooth, WLAN, Cellular, or other networks) to transmit and receive data streams through a wireless link to/from a network. Network interface 604 may also be a wired interface for direct connection to networks (e.g., the Internet, Ethernet, or other wireless systems). In one embodiment, wireless subsystem 615 couples mobile device 610 to a wireless communications network established by one or more wireless access points, base stations, satellite systems, etc., such as an LTE and non-LTE wireless communications networks.

Memory 605 may be coupled to processor 612 to store instructions for execution by processor 612. In some embodiments, memory 605 is non-transitory. Memory 605 may also store one or more processing modules (i.e., GNSS engine 635, positioning controller 640, and/or carrier aggregation module 645) to implement embodiments described below. It should be appreciated that embodiments of the invention as described herein may be implemented through the execution of instructions, for example as stored in the memory 605 or other element, by processor 612 of mobile device 610 and/or other circuitry of mobile device 610 and/or other devices. Particularly, circuitry of mobile device 610, including but not limited to processor 612, may operate under the control of a program, routine, or the execution of instructions to execute methods or processes in accordance with embodiments of the invention. For example, such a program may be implemented in firmware or software (e.g. stored in memory 605 and/or other locations) and may be implemented by processors, such as processor 612, and/or other circuitry of mobile device 610. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines, managers, or modules described herein may be performed by mobile device 610 itself and/or some or all of the functions, engines or modules described herein may be performed by another system connected through I/O controller 625 or network interface 604 (wirelessly or wired) to mobile device 610. Thus, some and/or all of the functions may be performed by another system and the results or intermediate calculations may be transferred back to mobile device 610.

It should be appreciated that when the device discussed herein is a mobile or wireless device, that it may communicate via one or more wireless communication links through a wireless network that are based on or otherwise support any suitable wireless communication technology. For example, in some aspects mobile device may associate with a network including a wireless network. In some aspects the network may comprise a body area network or a personal area network (e.g., an ultra-wideband network). In some aspects the network may comprise a local area network or a wide area network. In some aspects, the network may comprise a wireless communication network(s). A wireless device may support or otherwise use one or more of a variety of wireless communication technologies for communicating over the wireless communications network(s), protocols, or standards such as, for example, LTE, CDMA2K, CDMA, TDMA, OFDM, OFDMA, WiMAX, and WLAN. Similarly, a wireless device may support or otherwise use one or more of a variety of corresponding modulation or multiplexing schemes. A mobile wireless device may wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a headset (e.g., headphones, an earpiece, etc.), a user I/O device, or any other suitable device.

In some aspects a wireless device may comprise an access device (e.g., a WLAN access point) for a communication system. Such an access device may provide, for example, connectivity to another network (e.g., a wide area network such as the Internet or a cellular network) via a wired or wireless communication link. Accordingly, the access device may enable another device (e.g., a WLAN station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for exploiting Radio Access Technology (RAT) system information blocks for global navigation satellite system (GNSS) positioning, comprising:
    processing, by a mobile device with carrier aggregation, a voice call via a first RAT, the processing of the voice call including putting second RAT capabilities of the mobile device out of service, wherein the mobile device utilizes a single transceiver to maintain the voice call;
    during the voice call via the first RAT, while the second RAT capabilities are out of service, accessing a communications network using the second RAT with an available carrier aggregation receiver of the mobile device, wherein the available carrier aggregation receiver is capable of only receiving signals;
    obtaining, with the available carrier aggregation receiver, one or more broadcast system information blocks of the second RAT; and
    determining a time based, at least in part, on timing information obtained from the one or more broadcast system information blocks.

2. The method of claim 1, wherein the first RAT is a non-Long Term Evolution (LTE) RAT and the second RAT is an LTE RAT, and wherein the one or more broadcast system information blocks of the second RAT comprise at least one system information block (SIB) 8 block, at least one SIB 16 block, or at least one SIB 8 block and at least one SIB 16 block.

3. The method of claim 2, wherein the accessing the communications network using the second RAT is performed in response to initiation of a positioning process during the voice call, and
    wherein the one or more broadcast system information blocks of the second RAT comprise at least one SIB 8 block, and
    wherein the determining the time is performed on the mobile device and comprises:
    decoding the at least one SIB 8 block to obtain one or more of Code Division Multiple Access (CDMA) system times, system identifiers, network identifiers, and time zone identifiers; and
    performing time transfer during the voice call over the non-LTE RAT, using at least the one or more of CDMA system times, system identifiers, network identifiers, and time zone identifiers.

4. The method of claim 2, wherein the accessing the communications network using the second RAT is performed in response to initiation of a positioning process during the voice call, and
    wherein the one or more broadcast system information blocks of the second RAT comprise at least one SIB 16 block, and
    wherein the determining the time is performed on the mobile device and comprises:
    decoding the at least one SIB 16 block to obtain global positioning system (GPS) timing information; and
    performing time transfer during the voice call over the non-LTE RAT, using at least the GPS timing information.

5. The method of claim 1, wherein the mobile device comprises a separate receiver for each subscriber information module of the mobile device.

6. The method of claim 1, wherein the mobile device comprises a single receiver shared by each subscriber information module of the mobile device.

7. The method of claim 1, wherein a first subscriber information module of the mobile device is associated with a communications network using the second RAT, and a second subscriber information module of the mobile device is associated with a different communications network using the first RAT, and
    wherein the processing the voice call is performed using a first receiver of the mobile device, and
    wherein the available carrier aggregation receiver is tunable independently of the first receiver.

8. The method of claim 1, wherein the mobile device comprises a single subscriber information module that is associated with a first communications network using the first RAT and a second communications network using the second RAT, and
    wherein the processing the voice call is performed using a first receiver of the mobile device, and
    wherein the available carrier aggregation receiver is tunable independently of the first receiver.

9. The method of claim 1, wherein the first RAT is an asynchronous Long Term Evolution (LTE) RAT and the second RAT is a synchronous LTE RAT, and wherein the timing information is obtained from one or more broadcast system information blocks of the synchronous LTE RAT.

10. The method of claim 1, further comprising:
    prior to utilizing the obtained timing information for performing time transfer, determining whether timing information already available at the mobile device is more accurate than the obtained timing information for purposes of performing a positioning process based on the time transfer;
    when the timing information already available at the mobile device is more accurate than the obtained timing information, disregarding the obtained timing information and utilizing the timing information already available at the mobile device to perform the time transfer; and when the obtained timing information is more accurate than the timing information already available at the mobile device, utilizing the obtained timing information to perform the time transfer.

11. A non-transitory computer readable storage medium including instructions that, when executed by a processor, cause the processor to perform a method for exploiting Radio Access Technology (RAT) system information blocks for global navigation satellite system (GNSS) positioning, the method comprising:

processing, by a mobile device with carrier aggregation, a voice call via a first RAT, the processing of the voice call including putting second RAT capabilities of the mobile device out of service, wherein the mobile device utilizes a single transceiver to maintain the voice call;

during the voice call via the first RAT, while the second RAT capabilities are out of service, accessing a communications network using the second RAT with an available carrier aggregation receiver of the mobile device, wherein the available carrier aggregation receiver is capable of only receiving signals;

obtaining, with the available carrier aggregation receiver, one or more broadcast system information blocks of the second RAT; and determining a time based, at least in part, on timing information obtained from the one or more broadcast system information blocks.

12. The non-transitory computer readable storage medium of claim 11, wherein the first RAT is a non-Long Term Evolution (LTE) RAT and the second RAT is an LTE RAT, and wherein the broadcast system information blocks of the second RAT comprise at least one system information block (SIB) 8 block, at least one SIB 16 block, or at least one SIB 8 block and at least one SIB 16 block.

13. The non-transitory computer readable storage medium of claim 12, wherein the accessing the communications network using the second RAT is performed in response to initiation of a positioning process during the voice call, and wherein the one or more broadcast system information blocks of the second RAT comprise at least one SIB 8 block, and wherein the determining the time is performed on the mobile device and comprises:

decoding the at least one SIB 8 block to obtain one or more of Code Division Multiple Access (CDMA) system times, system identifiers, network identifiers, and time zone identifiers; and performing time transfer during the voice call over the non-LTE RAT, using at least the one or more of CDMA system times, system identifiers, network identifiers, and time zone identifiers.

14. The non-transitory computer readable storage medium of claim 12, wherein the accessing the communications network using the second RAT is performed in response to initiation of a positioning process during the voice call, and wherein the one or more broadcast system information blocks of the second RAT comprise at least one SIB 16 block, and wherein the determining the time is performed on the mobile device and comprises:

decoding the at least one SIB 16 block to obtain global positioning system (GPS) timing information; and performing time transfer during the voice call over the non-LTE RAT, using at least the GPS timing information.

15. The non-transitory computer readable storage medium of claim 11, wherein a first subscriber information module of the mobile device is associated with a communications network using the second RAT, and a second subscriber information module of the mobile device is associated with a different communications network using the first RAT, and wherein the processing the voice call is performed using a first receiver of the mobile device, and wherein the available carrier aggregation receiver is tunable independently of the first receiver.

16. A mobile device for exploiting Radio Access Technology (RAT) system information blocks for global navigation satellite system (GNSS) positioning, comprising:

a single transceiver;

a memory; and a processor coupled with the memory, wherein the processor is configured to:

process a voice call via a first RAT, the processing of the voice call including putting second RAT capabilities of the mobile device out of service, wherein the mobile device utilizes the single transceiver to maintain the voice call;

during the voice call via the first RAT, while the second RAT capabilities are out of service, access a communications network using the second RAT with an available carrier aggregation receiver of the mobile device, wherein the available carrier aggregation receiver is capable of only receiving signals;

obtain, with the available carrier aggregation receiver, one or more broadcast system information blocks of the second RAT; and determine a time based, at least in part, on timing information obtained from the one or more broadcast system information blocks.

17. The mobile device of claim 16, wherein the first RAT is a non-Long Term Evolution (LTE) RAT and the second RAT is an LTE RAT, and wherein the broadcast system information blocks of the second RAT comprise at least one system information block (SIB) 8 block, at least one SIB 16 block, or at least one SIB 8 block and at least one SIB 16 block.

18. The mobile device of claim 17, wherein the accessing the communications network using the second RAT is performed in response to initiation of a positioning process during the voice call, and wherein the one or more broadcast system information blocks of the second RAT comprise at least one SIB 8 block, and wherein the processor is configured to determine the time by:

decoding the at least one SIB 8 block to obtain one or more of Code Division Multiple Access (CDMA) system times, system identifiers, network identifiers, and time zone identifiers, and performing time transfer during the voice call over the non-LTE RAT, using at least the one or more of CDMA system times, system identifiers, network identifiers, and time zone identifiers.

19. The mobile device of claim 17, wherein the accessing the communications network using the second RAT is performed in response to initiation of a positioning process during the voice call, and wherein the one or more broadcast system information blocks of the second RAT comprise at least one SIB 16 block, and wherein the processor is configured to determine the time by:

decoding the at least one SIB 16 block to obtain global positioning system (GPS) timing information, and performing time transfer during the voice call over the non-LTE RAT, using at least the GPS timing information.

20. The mobile device of claim 17, wherein a first subscriber information module of the mobile device is associated with a communications network using the second RAT, and a second subscriber information module of the mobile device is associated with a different communications network using the first RAT, and wherein the processing the voice call is performed using a first receiver of the mobile device, and wherein the available carrier aggregation receiver is tunable independently of the first receiver.

21. The mobile device of claim 16, further comprising a separate receiver for each subscriber information module of the mobile device.

22. The mobile device of claim 16, further comprising a single receiver shared by each subscriber information module of the mobile device.

23. The mobile device of claim 16, further comprising a single subscriber information module that is associated with a first communications network using the first RAT and a second communications network using the second RAT, and wherein the processing the voice call is performed using a first receiver of the mobile device, and wherein the available carrier aggregation receiver is tunable independently of the first receiver.

24. The mobile device of claim 16, wherein the first RAT is an asynchronous Long Term Evolution (LTE) RAT and the second RAT is a synchronous LTE RAT, and wherein the timing information is obtained from one or more broadcast system information blocks of the synchronous LTE RAT.

25. The mobile device of claim 16, further comprising the processor to:

prior to utilizing the obtained timing information for performing time transfer, determine whether timing information already available at the mobile device is more accurate than the obtained timing information for purposes of performing a positioning process based on the time transfer;

when the timing information already available at the mobile device is more accurate than the obtained timing information, disregard the obtained timing information and utilize the timing information already available at the mobile device to perform the time transfer; and when the obtained timing information is more accurate than the timing information already available at the mobile device, utilize the obtained timing information to perform the time transfer.

26. A mobile device for exploiting Radio Access Technology (RAT) system information blocks for global navigation satellite system (GNSS) positioning, comprising:

means for processing, by the mobile device with carrier aggregation, a voice call via a first RAT, the processing of the call including putting second RAT capabilities of the mobile device out of service, wherein the mobile device utilizes a single transceiver to maintain the voice call;

means for accessing, during the voice call via the first RAT, while the second RAT capabilities are out of service, a communications network using the second RAT with an available carrier aggregation receiver of the mobile device, wherein the available carrier aggregation receiver is capable of only receiving signals;

means for obtaining, with the available carrier aggregation receiver, one or more broadcast system information blocks of the second RAT; and means for performing the time transfer based, at least in part, on timing information obtained from the one or more broadcast system information blocks.

* * * * *